Sept. 4, 1962   C. D. GILMORE   3,052,194
CUTTER DISKS FOR RECIPROCATING DOUGHNUT FORMERS
Filed Sept. 22, 1961
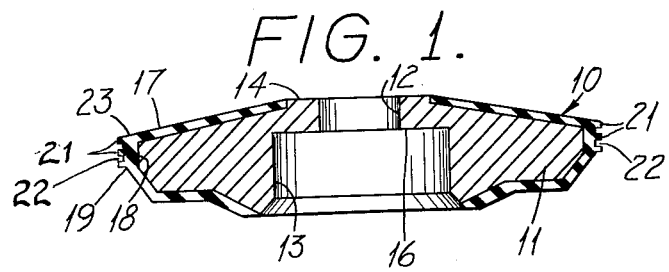
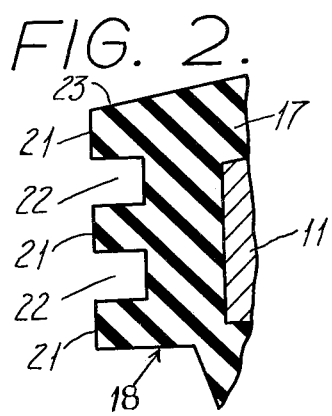
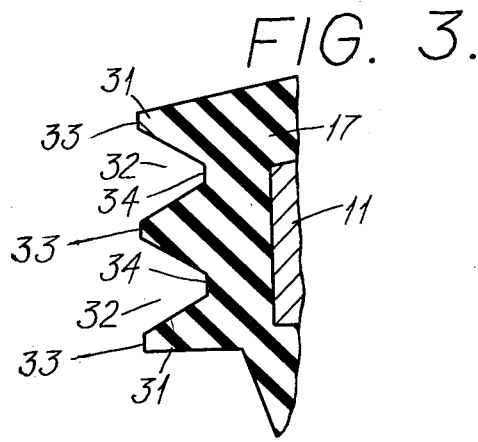
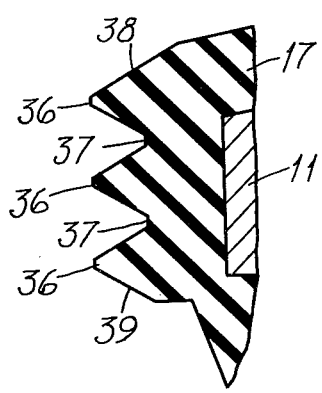
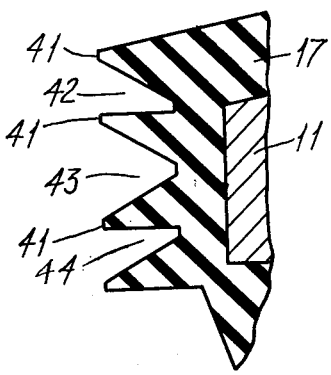
INVENTOR
CHACE D. GILMORE
BY
ATTORNEY

United States Patent Office 3,052,194
Patented Sept. 4, 1962

3,052,194
CUTTER DISKS FOR RECIPROCATING
DOUGHNUT FORMERS
Chace D. Gilmore, 219 S. Mechanics St.,
West Chester, Pa.
Filed Sept. 22, 1961, Ser. No. 140,044
5 Claims. (Cl. 107—14)

The present invention relates generally to doughnut formers of the reciprocating type, and it has particular relation to improvements in the construction of a cutting disk for use in such formers.

This application is a continuation-in-part of my co-pending application Serial No. 740,486, filed June 6, 1958, and now abandoned.

Heretofore, doughnut formers have been made with a fixed metal cutter disk which cooperates with a reciprocating tubular cutting sleeve to cut and shape raw dough forms for deep fat frying. The metal-to-metal contact of the reciprocating cutter sleeve with such metal disks causes frequent wear of one or both parts, requiring replacement or complete renovation of the former. When appreciable wear occurs, the former does not cut properly the raw dough, but either leaves strings of uncut dough or cuts the raw dough forms in undesirable irregular shapes and varying sizes.

In my Letters Patent No. 2,882,838, issued April 21, 1959, there is shown and claimed a cutter disk for reciprocating dough formers of the character involved herein, wherein the edge of a metal disk is provided with a spherical recess or groove within which is mounted removably a flexible ring having a diameter slightly smaller than the diameter of said peripheral groove within which it is to be mounted, whereby it will be held in said groove by its own tendency to contract due to the inherent elasticity or resiliency of the material from which it is made. While this type of cutting disk worked satisfactorily and was an improvement over the conventional all metal disk, it nevertheless had a short operating life, the flexible ring had a tendency to work loose and required too frequent replacement for large commercial operations.

With the present invention there is provided an improved cutting disk for reciprocating doughnut formers which obviates all of the inherent disadvantages of the above-described disks. In the present invention, a metal disk or solid core is substantially covered with a tough flexible material and has an integrally formed peripheral edge extending radially beyond the periphery of the core which is provided with a series of alternately spaced radially extending ribs and grooves that provide a flexible wiping, sealing and cutting edge for the reciprocating cutting sleeve. This form of cutting disk is inexpensive to make, provides a more satisfactory and permanent type of disk since its cutting edge cannot be separated accidentally or otherwise from its metal base, and is far more durable in operation.

An object of the present invention is to provide an interchangeable cutting disk for reciprocating doughnut formers which is relatively inexpensive to make, durable to use and efficient in controlling the size of the raw dough forms being cut therewith.

Another object of the invention is the provision of a cutting disk having an integrally formed flexible cutting edge that will eliminate all metal-to-metal contact with the reciprocating cutting sleeve, and will provide a suitable sealing and wiping action on the surface of said sleeve to prevent the accumulation of dough particles therebetween.

A further object of the invention is to provide a cutting disk with a flexible cutting edge that insures complete cutting contact with its reciprocating cutting sleeve even when the same has an eccentric longitudinal movement as the result of wear and tear, or has an irregular cutting edge because of nicks or chips in its cutting surface due to careless handling in the plant.

Another object of the invention is the provision of a cutting disk having a flexible peripheral cutting edge provided with a series of annular radial grooves or recesses for the entrapment of a lubricant for lubricating the inner surface of the cutting sleeve during its period of use.

Other and further objects and advantages of the invention, which result in simplicity, economy and efficiency will be apparent from the following detailed description, reference being had to the accompanying drawings, forming a part hereof, wherein like numerals indicate like parts, in which:

FIGURE 1 is a diametric cross-sectional view of a complete cutting disk embodying the principles of the invention;

FIGURE 2 is an enlarged fragmentary detailed vertical sectional view of the peripheral cutting edge 18 shown in FIGURE 1;

FIGURE 3 is a view similar to FIGURE 2, but showing a modification which the peripheral edge of the cutting disk may assume;

FIGURE 4 is another view, similar to FIGURE 2, showing another modification which the invention may assume; and FIGURE 5 is another similar view to FIGURE 2, showing still another modification which the invention may assume.

Referring now to the drawings, and particularly to FIGURE 1 thereof, there is shown a cutting disk 10, comprising a solid core 11, which may be made of metal or any other suitable material, having an axial bore or aperture 12 extending therethrough and having an enlarged axial recess or counterbore 13 open at its bottom. The axial bore 12 is adapted to receive the axial stem projecting downwardly from the die tube (not shown), and the enlarged counterbore 13 is designed to receive a nut for attaching fixedly and removably the cutter disk 10 to the lower shouldered and threaded end of said stem in a conventional manner.

An envelope, casing or covering 17 of a suitable tough elastic or resilient material, as for example an oil resistant synthetic rubber such as neoprene or butadiene or other similar material, is bonded to the exterior surfaces of the core 11 in any suitable manner, as for example by vulcanization, so completely as to cover the exterior surfaces thereof except for the areas 14 and 16 adjacent the bore 12 and the enlarged counterbore 13. These surfaces 12 and 16 are not covered with said flexible material to provide a hard metal surface against which the cutter disk 10 may be drawn tightly and rigidly between the shoulder on the lower end of its stem and its fastening nut (not shown).

The casing or envelope 17 extends beyond the peripheral edge 18 of the core 11 to provide a peripheral cutting edge 19, which is flexible with respect of the remainder of said cutting disk 10. It will be obvious that the cutting edge 19 provides a flexible, sealable and yielding contact with the lower knife edge of a conventional reciprocating cutting sleeve, providing a wiping as well as a shearing contact therewith.

The cutting edge 19 is provided with a series of alternately spaced annular peripheral ridges or ribs 21 and grooves 22, which further increases the flexibility of said cutting edge and provides less frictional drag while improving its flexibility, sealing and wiping action over the inner surface of the longitudinally reciprocating cutting sleeve. With a flexible cutting edge the pressure of the raw dough flexes said cutting edge against the inner surface of the cutting sleeve in a tight but slidable manner.

The grooves 22 also serve to entrap small quantities of oil, used to lubricate the parts which are momentarily immersed in the hot cooking liquid immediately prior to assembly of the doughnut former, and such entrapped quantities of oil serve to further lubricate the inner contacting surface of the cutting sleeve during its operation.

In FIGURES 1 and 2, the alternately spaced annular ridges 21 and grooves 22 are substantially of a rectangular shape, and the top edge 23 of the top rib contiguous to the peripheral edge being inclined downwardly in alignment and as an extension of the top plane of the disk 10. This tapered portion 23 provides a suitable "lead-in" for proper concentric alignment with the cutter sleeve of a former.

Referring now to FIGURE 3, there is shown a modification wherein the ribs or ridges 31 are truncated as indicated at 33, and the grooves 32 are substantially V-shape with inward truncations, as indicated at 34.

In FIGURE 4, the peripheral edge of the cutting disk 10 consists of alternately spaced truncated ribs 36 and truncated grooves 37, which are provided with outwardly tapering end walls 38 and 39 that will serve to more easily and efficiently "lead-in" the knife edge of the longitudinally reciprocating cutter sleeve in a manner well understood in the art.

In the modification shown in FIGURE 5, the peripheral cutting edge of the disk 10 consists of a series of alternately spaced truncated ribs 41 and truncated grooves 42, 43 and 44. It will be noted, however, that in this modification, the upper two ribs and groove 42 project upwardly and away from the lower two ribs and groove 44, which project downwardly, providing a slightly different type of wiping action against the inner surface of the longitudinally reciprocating cutter sleeve. Obviously, the middle groove 43 is substantially larger than either of the flanking grooves 42 and 44.

The several forms of cutter disks shown in the drawings each have one feature in common, to-wit: the top surface of the top-rib contiguous to the peripheral edge being inclined downwardly to facilitate alignment and provide a suitable "lead-in" for the proper concentric alignment with the cutter sleeve of the former. In FIGURE 3, this edge is substantially indicated by the numeral 31; in FIGURE 4 by the numeral 38; and in FIGURE 5 by the numeral 41.

It will be obvious to anyone skilled in the art that conventional all metal reciprocating doughnut formers may be readily and easily equipped with the improved cutting disks of this invention by merely removing the original all metal disk and substituting the improved disk, whereby wornout doughnut formers may be given a renewed and prolonged life.

Although I have only described in detail and illustrated in the drawings several forms which the invention may assume, it will be readily apparent to those skilled in the art that the same need not be so limited, but that various other modifications may be made therein without departing from the spirit thereof or from the scope of the appended claims.

What I claim is:
1. A cutting disk for doughnut formers of the character described having a reciprocating cutter sleeve, comprising:
   (1) a core of solid material having an axial bore for receiving a mounting stem,
   (2) a covering of a tough oil resistant flexible material spaced from said bore and bonded to the remaining surfaces of its top and bottom sides,
   (3) said covering enclosing the peripheral edge of said core and projecting outwardly therefrom to provide an annular flexible extension,
   (4) said extension having on its peripheral edge a plurality of alternately spaced annular ribs and grooves, wherein at least some of said ribs and some of said grooves are of a substantially corresponding shape.

2. A cutting disk for doughnut formers of the character described having a reciprocating cutter sleeve, comprising:
   (1) a core of solid material having an axial bore for receiving a mounting stem,
   (2) a covering of a tough oil resistant flexible material spaced from said bore and bonded to the remaining surfaces of its top and bottom sides,
   (3) said covering enclosing the peripheral edge of said core and projecting outwardly therefrom to provide an annular flexible extension,
   (4) said extension having on its peripheral edge a plurality of vertically spaced circumferentially extending ribs, and
   (5) the top surface of the top rib contiguous to the peripheral edge being inclined downwardly to facilitate reciprocation into the cutter sleeve.

3. The cutting disk defined in claim 2, wherein the ribs are separated by grooves corresponding substantially in size to the size of said ribs.

4. The cutting disk defined in claim 2, wherein the ribs are separated by grooves corresponding substantially in shape to the shape of said ribs.

5. The cutting disk defined in claim 2, wherein the ribs are separated by grooves corresponding substantially in size and shape to the size and shape of said ribs.

References Cited in the file of this patent

UNITED STATES PATENTS

| | | |
|---|---|---|
| 2,148,236 | Hanle | Feb. 21, 1939 |
| 2,208,620 | Baisch | July 23, 1940 |
| 2,310,917 | Daly | Feb. 16, 1943 |
| 2,742,198 | Belshaw et al. | Apr. 17, 1956 |
| 2,882,838 | Gilmore | Apr. 21, 1959 |